3,317,377
SEDATIVE-ANALGESIC COMPOSITIONS
John A. Hill and Stephen Ashukian, both of New Brunswick, N.J., assignors to E. R. Squibb & Sons, Inc., New York, N.Y., a corporation of Delaware
No Drawing. Filed Apr. 19, 1966, Ser. No. 543,548
4 Claims. (Cl. 167—52)

This invention relates to a sedative-analgesic composition.

A combination of a sedative with an analgesic is frequently valuable for the relief of sleeplessness caused by or associated with pain in mammalian species. Chloral hydrate is a known sedative having advantages over barbiturates. Similarly, acetaminophen(N-acetyl-p-aminophenol) is an analgesic which does not produce the gastric irritation common to the salicylates and is a suitable analgesic for those having peptic ulcer and those sensitive to aspirin. Thus a sedative-analgesic combination containing these two compounds has clear advantages. The physical characteristics of these two compounds, however, makes it difficult to combine them in a liquid preparation.

For example, acetaminophen is difficultly soluble in many solvents acceptable for oral use and tends to precipitate at temperatures below room temperature. In addition, it poses problems with respect to taste and palatability. Vehicles for chloral hydrate too are few. In the case of the common vehicle alcohol, usually concentrations of less than 10% or more than 50% by volume are required to prevent separation of chloral alcoholate as a separate phase.

It has now been found that chloral hydrate and acetaminophen can be combined in a liquid preparation utilizing a vehicle comprising a balanced combination of glycerin, alcohol and propylene glycol. A combination containing at least about 300 mg. of chloral hyrdate and 200 mg. of acetaminophen per unit of dosage, preferably in a range of about 400 to 600 mg. of chloral hydrate and about 200 to 400 mg. of acetaminophen, especially about 500 mg. of the former and about 300 mg. of the latter, in a dosage unit of 1 teaspoonful (5 ml.) taken in multiples of one or two, is desirable. This dosage, it has been found, may be formulated in a liquid composition containing about 20 to 40% (w./v.) of glycerin (at least U.S.P. 95%), about 15 to 40% (w./v.) of propylene glycol and about 10 to 20% (v./v.) of alcohol (proportions based on final product composition). The preferred modification includes approximately 32% (w./v.) glycerin, 26% (w./v.) propylene glycol and 12% (v./v.) alcohol.

This may be admixed with water and to it may be added a sugar solution to provide the sweetness and body for an aqueous syrup, flavoring and other sweetening agents, as well as coloring agents for desired taste and color characteristics. Sorbitol is preferred as the sugar to provide the syrupy taste and consistency. Other adjuvants which may be included are cyclamate, saccharin, citric acid and/or sodium citrate. Preferably, a solution of chloral hydrate, glycerin, water, propylene glycol and acetaminophen is formed. Alcohol is added last.

This provides a stable composition from which both active ingredients do not separate and to which may be added other adjuvants for taste and appearance without disturbing the solubility or stability of the chloral hydrate and acetaminophen in solution. In general, the adjuvants may be added at any stage at which it is convenient. The following examples, however, describe the preferred mode of operation to achieve a stable liquid composition of pharmaceutical elegance.

*Example 1*

The following ingredients are used:

| | |
|---|---|
| Solution of chloral hydrate (3.75 kg.=53% w./w) in glycerin U.S.P. | kg__ 7.08 |
| Acetaminophen N.F. | kg__ 2.25 |
| Propylene glycol | kg__ 9.71 |
| Sorbitol solution U.S.P. | kg__ 4.84 |
| Sodium cyclamate N.F. | kg__ 0.66 |
| Sodium saccharin N.F. | kg__ 0.18 |
| Alcohol U.S.P. | liters__ 4.76 |
| Sodium citrate U.S.P. | kg__ 0.65 |
| Anhydrous citric acid U.S.P. | kg__ 0.29 |
| FD+C Yellow No. 6 | gm__ 15.0 |
| FD+C Red No. 2 | gm__ 7.5 |
| Glycerin, 98% | kg__ 8.52 |
| Imitation blood orange flavor | ml__ 30.0 |
| Water qs. | liters__ 37.5 |

1.90 liters of purified water are placed in a jacketed stainless steel vessel. The chloral hydrate in glycerin solution is added, followed by additional glycerin, propylene glycol and acetaminophen. The mixture is agitated and the sorbitol solution is added. The mixture is heated to 60° C. and maintained at this temperature until complete solution is obtained. The solution is then cooled, and the sodium cyclamate and sodium saccharin added.

The red and yellow coloring materials in about 350 ml. of water are added. When the solution has been cooled to about 30° C., 4.21 liters of alcohol are added and then a solution of the orange flavor in about 0.55 liter of alcohol.

The sodium citrate (0.65 kg.) and 0.23 kg. of the citric acid are dissolved in about 1.3 liters of water and added to the main batch. Water is added to make a volume of about 37 liters for the entire solution and the solution is agitated. The pH of the solution is then adjusted to within the range of 5.0 to 5.3 by the addition of a solution of the remaining citric acid in 250 ml. of water. This product is diluted with water to a final volume of 37.5 liters.

About 200 gm. of filter aid (Solka-Floc BW-100, Hyflo Super Cel and U.S.P. Talc) are added to the solution and allowed to stand overnight. The mixture is agitated and then filtered through a plate filter. The resulting clear solution is then filled in amber glass containers of suitable size. Each teaspoonful (5 ml.) of this solution contains 500 mg. of chloral hydrate and 300 mg. of acetaminophen. One or two teaspoonfuls in one half glassful (3 to 4 oz.) of water provides a pleasant orange flavored drink. If preferred, grape, pineapple or orange juice may be used instead of water.

*Example 2*

| | |
|---|---|
| Chloral hydrate U.S.P. | kg__ 3.75 |
| Acetaminophen N.F. | kg__ 2.25 |
| Glycerin 98% | kg__ 11.75 |
| Propylene glycol | kg__ 9.71 |
| Sorbitol solution U.S.P. | kg__ 4.84 |
| Sodium cyclamate N.F. | kg__ 0.66 |
| Sodium saccharin N.F. | kg__ 0.18 |
| Alcohol U.S.P. | liter__ 4.76 |
| Sodium citrate U.S.P. | kg__ 0.65 |
| Anhydrous citric acid | kg__ 0.29 |
| FD+C yellow No. 6 | gm__ 15.00 |
| FD+C red No. 2 | gm__ 7.50 |
| Imitation blood orange flavor | ml__ 30.00 |
| Water qs. | liter__ 37.50 |

1.90 liters of purified water are placed in a jacketed stainless steel vessel. The chloral hydrate, propylene glycol, acetaminophen and glycerin are added. This mixture is then used in the same manner as in Example 1.

What is claimed is:

1. A liquid sedative-analgesic composition comprising per dosage unit at least about 300 mg. of chloral hydrate and at least about 200 mg. of acetaminophen in a balanced vehicle comprising about 20 to 40% weight/volume of glycerin, about 15 to 40% weight/volume of propylene glycol and about 10 to 20% volume/volume of alcohol.

2. A composition as in claim 1 containing about 400 to 600 mg. of chloral hydrate and about 200 to 400 mg. of acetaminophen.

3. A composition as in claim 1 containing about 500 mg. of chloral hydrate and about 300 mg. of acetaminophen.

4. A composition as in claim 1 wherein there are about 500 mg. of chloral hydrate, about 300 mg. of acetaminophen, 32% w./v. of glycerin, about 26% w./v. of propylene glycol, about 12% v./v. of alcohol, flavors, sweetening agents and other adjuvants per 5 ml. of aqueous syrup.

No references cited.

ALBERT T. MEYERS, *Primary Examiner.*

STANLEY J. FRIEDMAN, *Assistant Examiner.*